(12) United States Patent
Banning et al.

(10) Patent No.: US 6,363,336 B1
(45) Date of Patent: Mar. 26, 2002

(54) FINE GRAIN TRANSLATION DISCRIMINATION

(75) Inventors: John Banning, Sunnyvale; H. Peter Anvin, San Jose; Benjamin Gribstad, Santa Clara, all of CA (US); David Keppel, Seattle, WA (US); Alex Klaiber, Mountain View; Paul Serris, Sunnyvale, both of CA (US)

(73) Assignee: Transmeta Corporation, Santa Clara, CA (US)

( * ) Notice: Subject to any disclaimer, the term of this patent is extended or adjusted under 35 U.S.C. 154(b) by 0 days.

(21) Appl. No.: 09/417,356

(22) Filed: Oct. 13, 1999

(51) Int. Cl.$^7$ .................................................. G06F 9/00
(52) U.S. Cl. ...................... 703/26; 712/209; 711/202; 711/206; 703/27
(58) Field of Search ...................... 703/26, 27; 709/213; 711/100, 202–207, 216; 712/209–244

(56) References Cited

U.S. PATENT DOCUMENTS

| | | | | |
|---|---|---|---|---|
| 4,589,092 A | * | 5/1986 | Matick ........................ 711/207 |
| 4,638,462 A | * | 1/1987 | Chang et al. ................. 711/216 |
| 4,794,522 A | * | 12/1988 | Simpson ........................ 703/26 |
| 5,437,017 A | * | 7/1995 | Moore et al. ................. 709/213 |
| 5,560,013 A | * | 9/1996 | Scalzi et al. ..................... 717/5 |
| 5,577,231 A | * | 11/1996 | Scalzi et al. ................... 703/26 |
| 5,781,750 A | * | 7/1998 | Blomgren et al. ........... 712/209 |
| 5,832,205 A | * | 11/1998 | Kelly et al. ..................... 714/53 |
| 6,009,516 A | * | 12/1999 | Steiss et al. ................. 712/244 |
| 6,088,758 A | * | 7/2000 | Kaufman et al. ............ 711/100 |
| 6,199,152 B1 | * | 3/2001 | Kelly et al. .................. 711/207 |
| 6,243,668 B1 | * | 6/2001 | Le et al. ........................ 703/26 |

\* cited by examiner

Primary Examiner—Zarni Maung
Assistant Examiner—Wen-Tai Lin
(74) Attorney, Agent, or Firm—Stephen L. King

(57) ABSTRACT

A method for determining if writes to a memory page are directed to target instructions which have been translated to host instructions in a computer which translates instructions from a target instruction set to a host instruction set, including the steps of detecting a write to a memory page storing target instructions which have been translated to host instructions, detecting whether a sub-area of the memory page to which the write is addressed stores target instructions which have been translated, and invalidating host instructions translated from addressed target instructions.

19 Claims, 4 Drawing Sheets

FINE GRAIN TRANSLATION DISCRIMINATION

BACKGROUND OF THE INVENTION

1. Field of the Invention

This invention relates to computer systems and, more particularly, to methods and apparatus for detecting attempts by a microprocessor which dynamically translates instructions from a target to a host instruction set to write to memory storing target instructions which have already been translated.

2. History of the Prior Art

Recently, a new microprocessor was developed which combines a simple but very fast host processor (called a "morph host") and software (referred to as "code morphing software") to execute application programs designed for a processor having an instruction set different than the instruction set of the morph host processor. The morph host processor executes the code morphing software which translates the application programs dynamically into host processor instructions which are able to accomplish the purpose of the original software. As the instructions are translated, they are stored in a translation buffer where they may be executed without further translation. Although the initial translation of a program is slow, once translated, many of the steps normally required for hardware to execute a program are eliminated. The new microprocessor has proven able to execute translated "target" programs as fast as the "target" processor for which the programs were designed.

The morph host processor includes a number of hardware enhancements which allow sequences of target instructions spanning known states of the target processor to be translated into host instructions, stored for further use in the translation buffer, and tested to determine if the translated instructions will execute correctly. These hardware enhancements allow the buffering of the effects of execution of translations until execution has succeeded. Memory stores and target processor state are updated upon successful execution in a process referred as "committing." These hardware enhancements allow the rapid and accurate handling of exceptions which occur during the execution of the sequences of host instructions by returning execution to the beginning of a sequence of instructions at which known state of the target processor exists. Returning the operations to a point in execution at which target state is known is called "rollback." The new microprocessor is described in detail in U.S. Pat. No. 5,832,205, Memory Controller For A Microprocessor For Detecting A Failure Of Speculation On The Physical Nature Of A Component Being Addressed, Kelly et al, Nov. 3, 1998, assigned to the assignee of the present invention.

One problem which can arise with the new processor is that it is possible with some operating systems and applications for a target processor to write to target instructions stored in memory. If this happens, the host instructions which are translations of the target instructions which have been overwritten are no longer valid. In order to assure that invalid host translations are not used, the new processor utilizes an indicator termed a "T bit." The T bit is stored with a physical page address in a translation lookaside buffer (TLB). A lookaside buffer stores entries including both the virtual and physical memory addresses of recent memory accesses allowing memory to be more rapidly accessed than through page tables. Each entry in the TLB of the new processor includes a T bit which is set whenever instructions on the addressed memory page have been translated to host instructions. If a write is attempted to a memory page protected by a T bit, a T bit exception is generated. A T bit exception causes an exception handler to look up a data structure which holds references to addresses of host instructions translated from the target instructions on the page protected by the T bit. The exception handler invalidates these translations by turning off the T bit protection for the TLB entry.

The arrangement for utilizing T bits is described in detail in U.S. patent application Ser. No. 08/702,771, entitled Translated Memory Protection Apparatus For An Advanced Microprocessor, Kelly et al, filed Aug. 22, 1996, and assigned to the assignee of the present invention.

Although the arrangement which utilizes T bits in TLB entries functions efficiently in most situations, some problems in operation remain. One of these problems is that certain target processors employ operating systems which do not discriminate between areas in which instructions and data are stored. For example, Microsoft Windows allows segments designated for instructions and other segments designated for data to be stored on the same memory pages.

If this occurs, an attempt to write to the data on such a memory page generates a T bit fault. The resulting exception causes all translations of target instructions on the memory page protected by the particular T bit to be invalidated even though a write to data does not indicate that any target instruction has changed. The invalidation of the correct translations on the memory page significantly slows the operation of the new microprocessor.

It is desirable to improve the operational speed of the new microprocessor by eliminating the invalidation of translations which are not affected by writes to memory pages protected by T bits and reducing the number of T bit traps taken that do not cause invalidation of translations.

SUMMARY OF THE INVENTION

It is, therefore, an object of the present invention to provide a faster microprocessor compatible with and capable of running application programs and operating systems designed for other microprocessors at a faster rate than those other microprocessors.

This and other objects of the present invention are realized in a computer which translates instructions from a target instruction set to a host instruction set by a method for determining if writes to a memory page are directed to target instructions which have been translated to host instructions in a computer which translates instructions from a target instruction set to a host instruction set, including the steps of detecting a write to a memory page storing target instructions which have been translated to host instructions, detecting whether a sub-area of the memory page to which the write is addressed stores target instructions which have been translated, and invalidating host instructions translated from addressed target instructions.

These and other objects and features of the invention will be better understood by reference to the detailed description which follows taken together with the drawings in which like elements are referred to by like designations throughout the several views.

DETAILED DESCRIPTION

Figure 1:
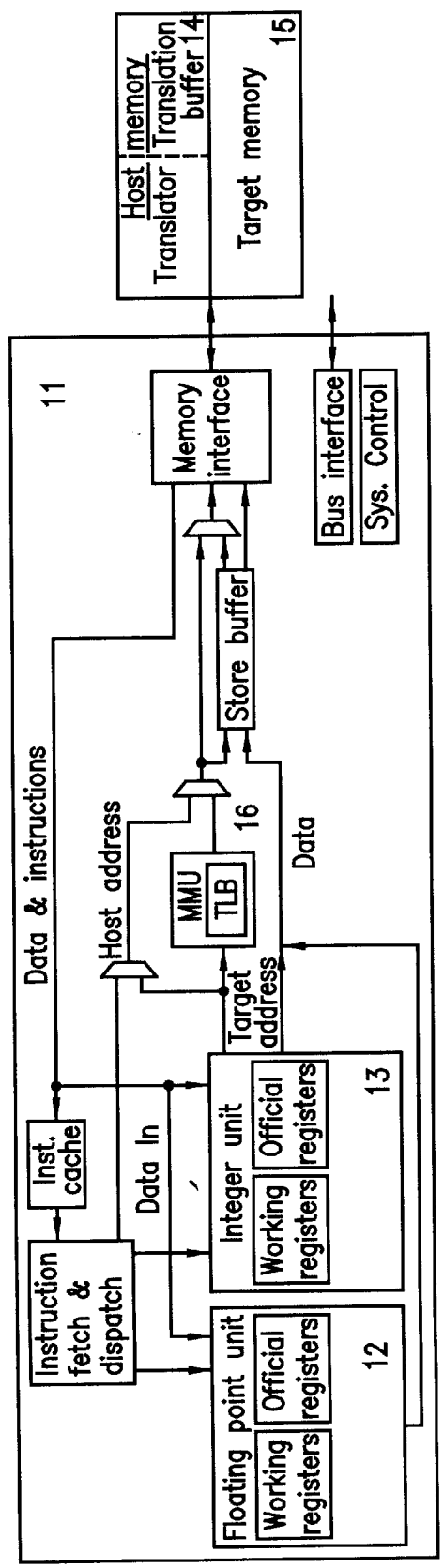
FIG. 1 is a block diagram illustrating a microprocessor utilizing the present invention.

FIG. 1 illustrates a microprocessor 11 which may utilize the present invention. The microprocessor pictured is described in detail in U.S. Pat. No. 5,832,205. The microprocessor includes a floating point unit 12, an integer unit 13, a translation buffer 14 which is a part of system memory, target memory 15 which is another portion of system memory, and a translation lookaside buffer 16 which is a part of a memory management unit.

As described above, the new microprocessor utilizes a unique method for assuring that translated instructions remain consistent with the target instructions from which they were translated. The method is referred to as a "T bit exception." A T bit is placed in the entry in the translation lookaside buffer 16 to signal that a memory page in target memory 15 to which a write is attempted stores target instructions which have been translated into host instructions stored in translation buffer 14. A T bit exception is generated when there is an attempt to write to a memory page which stores the target instructions which have been translated.

The purpose of the T bit is to allow translated host instructions to be invalidated so that the translation will not be used (or at least checked to determine if they are still valid before use) when the target instructions from which the translation was generated change. "Invalidate" is used to include both meanings in this specification. However, with some target processors (notably the X86 family), memory pages are allowed to exist which include both translated instructions and data. Writing data to a memory page does not alter instructions on the page so there is no reason to invalidate host instructions translated from instructions on the memory page. Consequently, a new process has been devised by which the code morphing software may determine whether an attempted write to a memory page is to translated instructions or to data and allow writes to data without invalidating translations of instructions on the page. The new process also limits the effect of writes to instructions on the page to areas of the memory page actually written.

The process of the present invention by which this is accomplished provides a finer grain division of memory pages which are protected by a T bit. The process divides protected pages into a plurality of equal-sized sub-areas and stores indicators for each of the sub-areas of such memory page. In one embodiment, the indicators form a mask providing one bit for each of the plurality of sub-areas which mask may be stored as a part of the memory page which is T bit protected. The indicators for each sub-area which is protected are referred to as "fine-grain T bits." In one embodiment, the mask is a 32 bit word so that each fine-grain T bit protects a 128 byte sub-area of a 4096 byte memory page. For each sub-area which includes target instructions, a fine-grain T bit is set. When a T bit exception occurs, the exception handler tests the indicators to determine if fine grain T bit protection has been provided for the memory page to which the write is being attempted.

In order to accelerate the testing, the lower order twelve bits of the address being accessed are used to generate a mask. This mask has a one at the position of the addressed byte (and if the stored data is long enough to run into the next sub-area, a one in the next sequential bit position). The mask of the lower order address bits and the fine grain T bit mask are ANDed. A zero resulting at any position indicates that a fine-grain T bit is set for that sub-area so that the T bit exception should be generated.

If the memory page has not been divided into sub-areas (i.e., only target instructions have been written to the page), the T bit exception is affirmed which invalidates translations in the translation buffer which relate to this page. If the memory page has been divided into sub-areas so that fine-grain T bit indicators exist and the lookup shows that the write is to one or more sub-areas not designated by a fine-grain T bit, then the original T bit exception is ignored by the software. If the memory page has been divided into sub-areas and the lookup shows that the write is to one or more sub-areas designated by a fine grained T bit (an area storing instructions), the original T bit exception is affirmed; and the exception handler invalidates the host instructions stored in the translation buffer translated from target instructions stored in the particular sub-area on the protected memory page.

As may be seen, fine-grain T bit protection eliminates a significant portion of the T bit exceptions generated by the new processor. Fine-grain T bit protection also limits the translations discarded to those which translate instructions in the sub-areas written to. Thus, the inventive process is much faster than constantly discarding the entire memory page.

Figure 2:
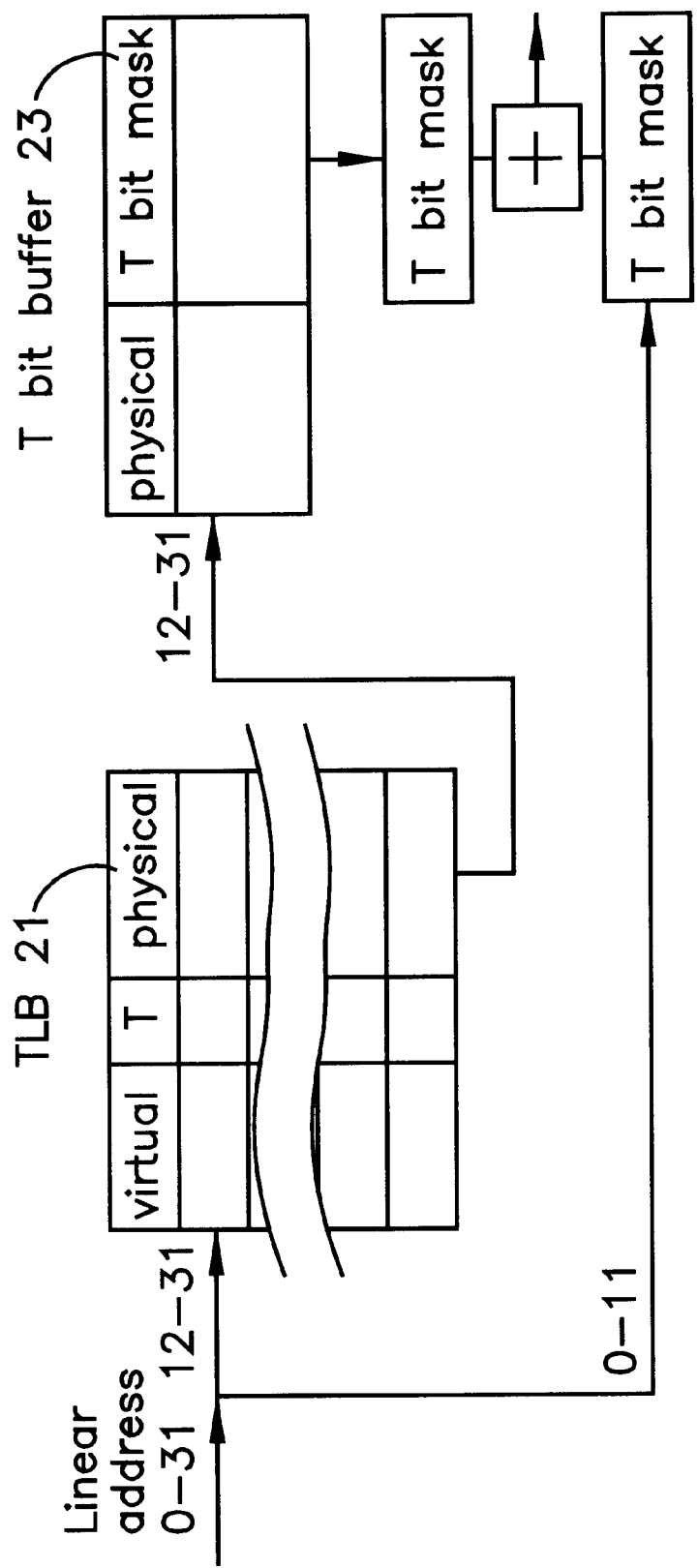
FIG. 2 is a block diagram illustrating a hardware implementation of a portion of the present invention.

Even though the process which uses the code morphing software and a software exception handler is faster than basic T bit protection, it may be further accelerated. In order to speed up the process of the invention, a hardware embodiment illustrated in FIG. 2 has been constructed. This embodiment includes a circuit 20 which has a first TLB 21 constructed in the manner of the TLB discussed previously. This TLB provides positions for storing entries each including the virtual address of a memory page, a physical page address at which the information addressed by the virtual memory address is actually stored, and a T bit. If a valid memory page stores target instructions which have been translated, the T bit is set for the entry in the TLB 21.

The circuit 20 also includes a second TLB-like structure 23 referred to as a "fine-grain T bit lookup table." The fine-grain T bit lookup table 23 typically has a smaller number of entries than TLB 21 since few memory pages which store target instruction that have been translated can be expected to also store data. The table 23 provides positions for storing entries each of which includes the physical page address of a memory page which stores both data and target instructions which have been translated. Each entry of the table 23 also stores the same set of indicators utilized in the software embodiment (e.g., a 32 bit word mask) indicating the sub-areas which actually are protected by fine-grain T bits.

Figure 3:
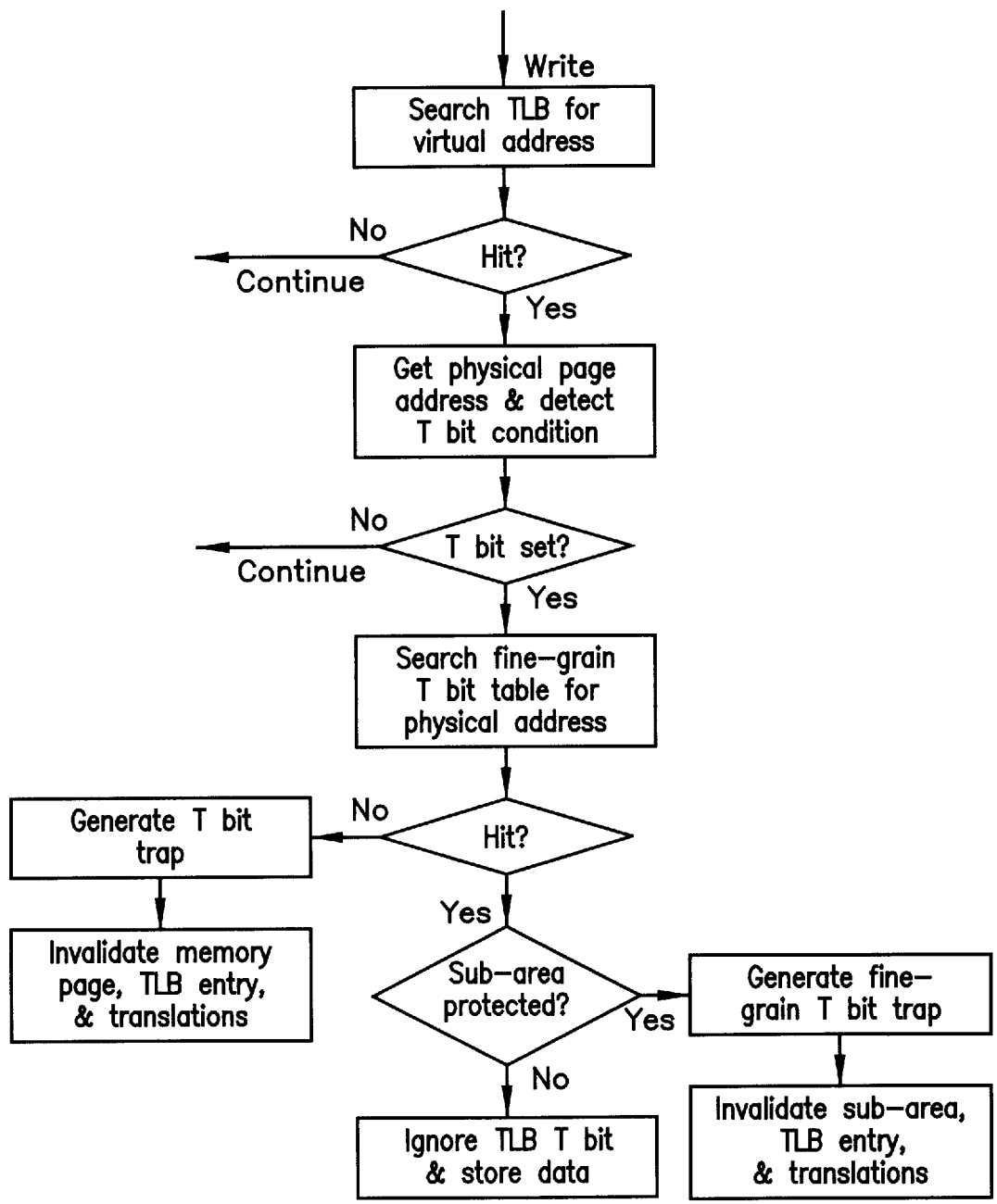
FIG. 3 is a flow chart illustrating the operation of the present invention.

The operation of the circuit 20 is illustrated by the flow chart of FIG. 3. When a write is attempted to a memory page, the table 23 is searched to determine if an entry for the addressed memory page exists in the the table. To accomplish this, a search is conducted for an entry including the virtual memory address. If such an entry exists, the physical address of the page is found and the condition of the T bit for the page is determined. If the T bit is not set, the memory page is not a page storing target instructions which have been translated so that it is not in fact a page having T bit protection. If the memory page stores target instructions which have been translated so that it is protected by a T bit which is set, a T bit trap is generated for the page; and the physical address of the entry is sent to the fine-grain T bit lookup table 23.

A search is conducted in the table 23 for an entry including the physical address. If an entry including the physical address does not exist in the table 23, either (1) the memory page does not store both data and translated target instructions or (2) the memory page does store both data and translated target instructions but an entry for the memory page has not been entered into table 23. In the first situation, since the set T bit in the entry in TLB 21 indicates that the page includes translated target instructions, a T bit trap exception is generated which invalidates the translations stored in the translation buffer which relate to this page. In the second situation, the entry for the physical address is loaded into the table 23 and the write is retried.

If there is a hit in the fine-grain T bit lookup table 23, a test for the particular sub-area of the page is conducted to determine whether the addressed sub-area is protected by a fine-grain T bit. If a fine-grain T bit is not set for the sub-area, no T bit trap exception is generated; and data is stored to the memory page. If a fine-grain T bit is set for the sub-area, a T bit trap exception is generated which invalidates the particular sub-area of the memory page, the entry in the TLB 21, and the translations stored in the translation buffer which relate to the particular sub-area of this memory page.

In order to determine whether a fine-grain T bit is set for the addressed area, a physical address match in the table 23 of the circuit 20 causes the mask indicating the sub-areas protected by fine grain T bits to be placed in a register 25 in one embodiment of the invention. The lower order bits of the virtual address are then used to determine whether the sub-areas addressed are protected by fine-grain T bits. These lower order bits define the address being accessed by the write access within the addressed memory page. The particular sub-areas of the page to which the write access is addressed are matched to the 32 bit T bit indicator of the mask in register 25 to determine whether the address is within one or more sub-areas protected by a fine-grain T bit. If the write is to a sub-area protected by a fine-grain T bit, then the trap causes a T bit exception to be generated invalidating the particular sub-areas, the translations of instructions stored in those sub-areas, and the addressed entry in the TLB 21.

To determine whether an addressed sub-area of a memory page has fine-grain T bit protection, one embodiment of the present invention utilizes the five highest bits of the lower twelve address bits to determine which of the 32 sub-areas is involved. Each such sub-area includes 128 bytes for a page of 4096 bytes. When the particular addressed sub-area has been determined, the lower order seven bits of the address are used to determine the specific byte addressed in the sub-area. When the addressed byte has been determined, the bit position holding the indicator for the addressed sub-area in the mask indicating the sub-areas protected by fine grain T bits (the mask in register 25) is tested to determine if a fine-grain T bit is set. Since a write may encompass as many as eight bytes in one embodiment, the length of the stored data (less one) is added to the beginning byte address within the sub-area to determine whether the write crosses into the next sub-area. If the write crosses into the next sub-area, the mask is also tested to determine if a fine grain T bit is set for the next sub-area.

The hardware takes the bit vector that is placed in the T bit mask register and shifts it down by the upper five of the twelve bit page offset. This moves the bit for the particular sub-area which was written into the low order bit position and the bit for the next sub-area into the next low order bit position. The one (or if the next sub-area has been written, two) low order bit is then tested. If either is set, a T bit exception is raised.

Figure 4:
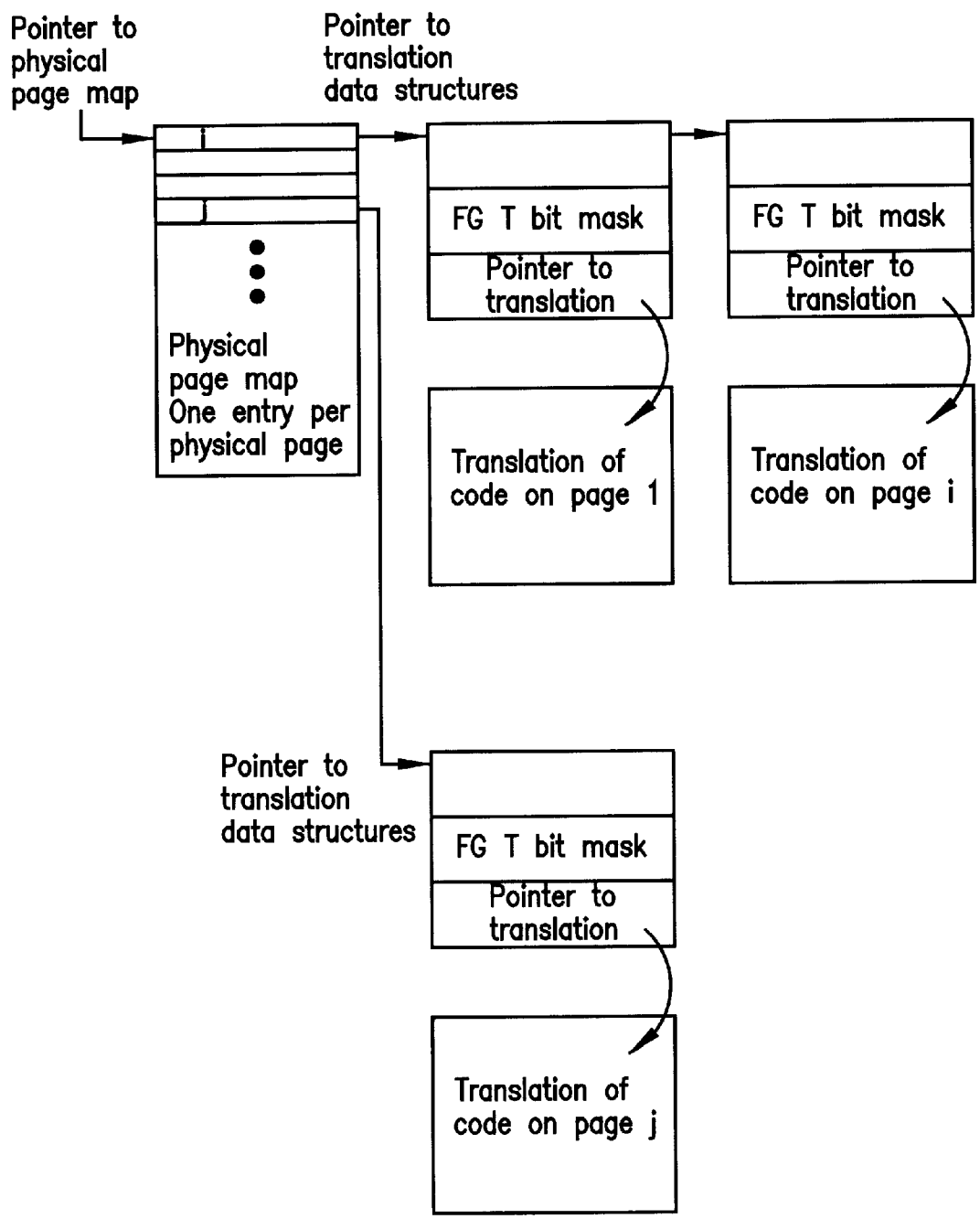
FIG. 4 is a block diagram illustrating the data structures in host memory for an implementation of the present invention.

The basic T bit protection described in patent application Ser. No. 08/702,771 utilizes a data structure which includes addresses of host instructions which have been translated from target instructions stored in areas protected by T bits. In order to utilize the fine grain aspects of the T bit protection afforded by the present invention optimally, this data structure is modified in the manner illustrated in FIG. 4. The code morphing software utilizes an array of entries called a physical page map. The entry in the physical page map is indexed by the high order bits of the physical address. Each entry is a pointer to the data structures which identify the translations which translate target instructions from the corresponding physical page. Each translation of target instructions on the physical page has a fine-grain T bit indicator (e.g., the thirty-two bit word mask) which identifies sub-areas of the memory page including translated target instructions protected by fine-grain T bits. When there is a T bit exception, the mask generated from the lower order bits of the store address and the size of the store is used in the manner described above to determine for each translation whether it translates instructions from the accessed sub-area of the physical page.

Each entry in the physical page map points to a list of pointers to translations. With each translation, it associates a T bit mask. If the T bit masks for the translations on such a list for a page are ORed together, a T bit mask for the page is formed. These may be stored and used to fill the table 23 quickly and to load a new page to the table 23; the masks are recomputed whenever a new translation is added to the list or whenever a translation on the list is invalidated.

It should be noted that when a target instruction or sequence of target instructions is translated, a sequence of host instructions is generated. Often these host instructions are reordered and scheduled to increase the speed of operation of the computer. Consequently, in one embodiment of the invention when a translation is invalidated because of a store, all of the sequence of host instructions associated with the translation are invalidated even those translating target instructions from areas not accessed by the store.

There are various alternative embodiments which may be utilized rather than the preferred embodiment which is illustrated. For example, the T bit buffer 23 might be accessed utilizing virtual rather than physical addresses. Such a modification would allow the buffers 21 and 23 to be accessed in the same clock. Another embodiment is also possible which would eliminate the buffer 23 and store the entire T bit mask rather than a single bit in the TLB 21. Other specific embodiments will occur to those skilled in the art.

The invention may be further enhanced by creating sub-areas of different sizes which are afforded fine-grain T bit protection. One embodiment for accomplishing this result further divides the sub-areas into smaller sub-areas which are also provided fine-grain T bit protection in the same manner as the larger sub-areas described above and to furnish circuitry creating an additional table similar to the table 23 and associated circuitry for determining if attempted stores are to protected ones of the smaller sub-areas.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a computer which translates instructions from a target instruction set to a host instruction set, a method for determining if writes to a memory page are directed to target instructions which have been translated to host instructions including the steps of:

detecting a physically-addressed write to a physical memory page storing target instructions which have been translated to host instructions, comprising the steps of:

storing in physically-addressable memory an indicator for each physical memory page that stores target instructions which have been translated to host instructions, and detecting the indicator when a write is attempted to each such physical memory page, detecting whether a sub-area of the physical memory page to which the write is addressed stores target instructions which have been translated, and invalidating host instructions translated from physically-addressed target instructions when a write is attempted to said sub-areas of physical system memory.

2. A method as claimed in claim 1 in which the step of detecting whether a sub-area of the physical memory page to which the write is addressed stores target instructions which have been translated comprises the steps of:

storing in physically-addressable memory an indicator for each sub-area of a physical memory page that stores target instructions which have been translated to host instructions, and detecting the indicator for such sub-area when a write is attempted to each such sub-area of such physical memory page.

3. A method as claimed in claim 1 in which the step of invalidating host instructions translated from physically-addressed target instructions comprises invalidating all host instructions translated from addressed target instructions stored on a physical memory page which stores only target instructions.

4. A method as claimed in claim 1 in which the step of invalidating host instructions translated from physically-addressed target instructions comprises invalidating only host instructions translated from physically-addressed target instructions stored on a sub-area of a memory page to which the write is addressed.

5. A method as claimed in claim 1 in which the step of invalidating host instructions translated from physically-addressed target instructions comprises invalidating all host instructions which are part of a translation from physically-addressed target instructions stored in any sub-area of a physical memory page to which the write is addressed.

6. A computer which translates instructions from a target instruction set to a host instruction set comprising:

a processing unit for executing host instructions, bsystem memory, a memory management unit for controlling access to system memory including:

means for indicating physical portions of system memory which store target instructions that have been translated to host instructions, means responding to physically-addressed instructions for indicating sub-areas of the physical portions of system memory which store target instructions that have been translated to host instructions, means for invalidating host instructions translated from target instruction stored in portions of physical system memory which store only target instructions when a write is attempted to such portions of physical system memory, and means for invalidating host instructions translated from target instructions stored in sub-areas of portions of physical system memory which store target instructions when a write is attempted to such sub-areas of physical system memory.

7. A computer as claimed in claim 6 further comprising means for invalidating host instructions translated from target instructions stored in sub-areas of sub-areas of portions of physical system memory which store target instructions when a write is attempted to such sub-areas of sub-areas of portions of physical system memory.

8. A computer as claimed in claim 6 in which the means for indicating portions of physical system memory which store target instructions that have been translated to host instructions, comprises:

a translation lookaside buffer for storing entries addressable by virtual addresses for portions of system memory, each entry including a physical address of a portion of system memory and an indication of whether translated target instructions are stored in the portion.

9. A computer as claimed in claim 6 in which the means responding to physically-addressed instructions for indicating sub-areas of the portions of physical system memory which store target instructions that have been translated to host instructions, comprises:

a table for storing entries for portions of system memory addressable by physical addresses, each entry including indicators distinguishing sub-areas in which translated target instructions are stored.

10. A computer as claimed in claim 9 in which:

the sub-areas are equal sized, and the indicators in each entry are bit positions the condition of which distinguishes storage of translated target instructions and the position of which indicates the sub-area of the portion.

11. A computer as claimed in claim 10 in which the means for invalidating host instructions stored in sub-areas of portions of physical system memory which store target instructions when a write is attempted to such sub-areas comprises:

exception handling means responsive to a write to a sub-area storing target instructions which have been translated to host instructions for invalidating host instructions translated from target instructions stored in such sub-areas.

12. A computer as claimed in claim 11 further comprising exception handling means for invalidating portions of system memory which store host instructions translated from target instructions which have been translated when a write is attempted to such portions.

13. A memory management unit for controlling access to system memory in a computer which translates instructions from a target instruction set to a host instruction set including:

means responding to physically-addressed instructions for indicating portions of system memory which store target instructions that have been translated to host instructions, means responding to physically-addressed instructions for indicating sub-areas of the portions of system memory which store target instructions that have been translated to host instructions, means for invalidating host instructions translated from target instruction stored in portions of system memory which store only target instructions when a write is attempted to such portions of system memory, and means for invalidating host instructions translated from target instructions stored in sub-areas of portions of system memory which store target instructions when a write is attempted to such sub-areas of system memory.

14. A memory management unit as claimed in claim 13 further comprising means for invalidating host instructions translated from target instructions stored in sub-areas of sub-areas of portions of system memory which store target instructions when a write is attempted to such sub-areas of sub-areas of system memory.

15. A memory management unit as claimed in claim 13 in which the means responding to physically-addressed instructions for indicating portions of system memory which store target instructions that have been translated to host instructions, comprises:

a translation lookaside buffer for storing entries addressable by virtual addresses for portions of physical system memory, each entry including a physical address of a portion of system memory and an indication of whether translated target instructions are stored in the portion.

16. A memory management unit as claimed in claim 13 in which the means responding to physically-addressed instructions for indicating sub-areas of the portions of system memory which store target instructions that have been translated to host instructions, comprises:

a table for storing entries for portions of system memory addressable by physical addresses, each entry including indicators distinguishing sub-areas in which translated target instructions are stored.

17. A memory management unit as claimed in claim 16 in which:

the sub-areas are equal sized, and the indicators in each entry are bit positions the condition of which distinguishes storage of translated target instructions and the position of which indicates the sub-area of the portion.

18. A memory management unit as claimed in claim 15 in which the means responding to physically-addressed instructions for invalidating host instructions stored in sub-areas of portions of system memory which store target instructions when a write is attempted to such sub-areas comprises:

exception handling means responsive to a write to a sub-area storing target instructions which have been translated to host instructions for invalidating host instructions translated from target instructions stored in such sub-areas.

19. A memory management unit as claimed in claim 18 further comprising exception handling means for invalidating portions of system memory which store host instructions translated from target instructions which have been translated when a write is attempted to such portions.

* * * * *